US005489947A

United States Patent [19]
Cooper

[11] Patent Number: 5,489,947
[45] Date of Patent: Feb. 6, 1996

[54] ON SCREEN DISPLAY ARRANGEMENT FOR A DIGITAL VIDEO SIGNAL PROCESSING SYSTEM

[75] Inventor: Jeffrey A. Cooper, Indianapolis, Ind.

[73] Assignee: Thomson Consumer Electronics, Inc., Indianapolis, Ind.

[21] Appl. No.: 390,896

[22] Filed: Feb. 15, 1995

Related U.S. Application Data

[63] Continuation of Ser. No. 261,200, Jun. 17, 1994.

[51] Int. Cl.$^6$ .................................................. H04N 7/087
[52] U.S. Cl. ........................ 348/589; 348/598; 348/600
[58] Field of Search ..................................... 348/589, 598, 348/600, 503, 509, 570, 598, 599; H04N 5/262, 5/268, 7/087, 7/08, 9/76

[56] References Cited

U.S. PATENT DOCUMENTS

| 4,680,629 | 7/1987 | Fukushima | 348/563 |
| 4,768,083 | 8/1988 | Romesburg | 348/600 |

OTHER PUBLICATIONS

Document identified as "Schematic PIP Module—TCE IMC Chasses".
"Apple II, Reference Manual" Apple Computer Inc., 10260 Bandley Dr., Cupertino, CA 95014, Cover pgs.+pgs. 12,13, 18,19,20,21,68,69, 130 & 131.
"PIP 2250 Picture–in–Picture Processor", ITT Semiconductors ITT, Edition 1988/89 Cover pgs+contents pg and pgs. 3 & 4.

Primary Examiner—Victor R. Kostak
Assistant Examiner—Nathan J. Flynn
Attorney, Agent, or Firm—Joseph S. Tripoli; Peter M. Emanuel

[57] ABSTRACT

A digital video signal processing system receives encoded packets of data representing video image information in compressed form. A video decoder and an associated video RAM are used to decode and decompress the video packets to form groups of video image representative digital words. The video image groups are organized in a compressed component format (e.g., Y, U, V in the ratio 4:2:2) related to the video image compression format in which pairs of color related components correspond to more than one pixel. The video decoder also includes an on-screen display (OSD) unit which converts a graphics bit map stored in a section of the video RAM to groups of graphic image representative digital words. The graphic image groups are organized in an uncompressed component format (Y, U, V in the ratio 4:4:4). Color related components of the uncompressed graphic image groups are deleted by a converter so as to form new graphic image groups having the same format as the video image groups which may be readily multiplexed with the video image groups to insert a graphics image within a video image.

10 Claims, 3 Drawing Sheets

ON SCREEN DISPLAY ARRANGEMENT FOR A DIGITAL VIDEO SIGNAL PROCESSING SYSTEM

This is a continuation of application Ser. No. 08/261,200, filed Jun. 17, 1994.

CROSS REFERENCE TO RELATED APPLICATION

This application is related to U.S. patent application Ser. No. 08/261,623 entitled "On Screen Display Arrangement for a Digital Video Signal Processing System" filed in the name of B. W. Beyers, Jr. on the same day as this application and assiged to the same assignee.

1. Field of the Invention

The invention concerns an "on screen display" (OSD) arrangement for a digital video signal processing system.

2. Background of the Invention

On screen display (OSD) arrangements employed in video processing systems include a switching (or "multiplexing") network for switching between graphic image representative signals and normal video signals so that a graphic image can be displayed on the screen of a picture reproduction device either in place of the image represented by the video signals or together with (inserted in) the image. The graphic image can take the form of alphanumeric symbols or pictorial graphics, and can be used to indicate status information, such as channel numbers or time, or operating instructions.

In an OSD arrangement for use in an analog video signal processing system, the multiplexing network typically operates to switch in levels corresponding to the desired intensity of respective portions of the graphic image at the time the graphic image portions are to be displayed. In such an arrangement the graphic image representative signals take the form of timing pulses which occur when the graphic image portions are to be displayed and are used to control the multiplexing network. Such an analog OSD arrangement can also be used in a digital video processing system, but requires that the video signals be first converted to analog form. While digital video signal processing systems typically include a digital-to-analog converter section in which the digital video signals are converted to analog form, it may be more cost effective for the OSD arrangement to be incorporated as an integral part of the digital video processing section.

SUMMARY OF THE INVENTION

The invention concerns a digital OSD arrangement for a digital video signal processing system, and especially one for a digital video processing system in which the digital video signals represent image information in compressed form.

More specifically the invention concerns an OSD arrangement for a digital video processing system which includes a source of a sequence of digital words representing respective components of a video image. The video image component representative digital words are organized in groups corresponding in a compressed form to more than one picture element. For example, the groups may correspond to two picture elements and may include first and second luminance components corresponding to respective ones of the two picture elements, and two color difference signals corresponding to each of the two picture elements. A memory stores digital words representing respective components of a graphics image. The graphic image component representative digital words are organized in groups corresponding in uncompressed form to respective picture elements. For example, the groups may include the luminance and a pair of color difference components corresponding to respective picture elements. A converter converts the graphic representative image groups stored in the memory to new groups of graphic image representative groups which are of the same form as the video image representative groups to make it possible to multiplex the video image representative groups and the graphics image representative groups. For example, the converter produces new graphic representative groups which include first and second luminance components corresponding to respective ones of the two picture elements, and a pair of color difference signals corresponding to each of the two picture elements. A multiplexer selects either ones of the video image representative groups or ones of the graphics image representative groups to produce a sequence resultant image representative groups.

These and other aspects of the invention will be described with respect to the accompanying Drawing.

DETAILED DESCRIPTION OF THE DRAWING

Figure 1:
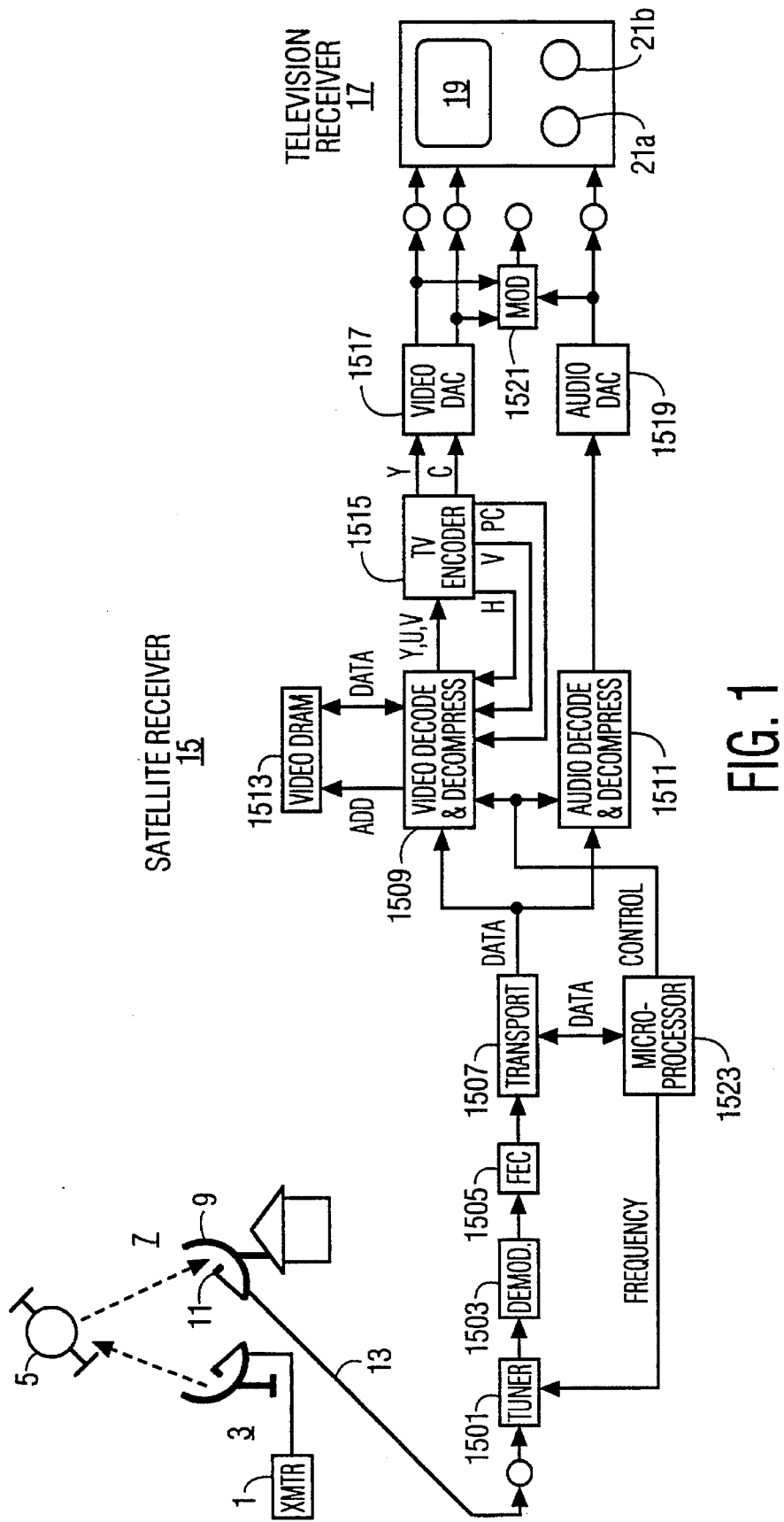
FIG. 1 is a block diagram of a digital satellite television system including a digital signal processing section including a digital OSD arrangement as an integral part in accordance with an aspect of the invention.

In the satellite television system shown in FIG. 1, a transmitter 1, with an associated transmitting antenna 3, transmits television signals including video and audio components to a satellite 5 in geosynchronous earth orbit. Satellite 5 receives the television signals transmitted by transmitter 1 and retransmits them toward the earth. The television signals transmitted by satellite 5 are received by an antenna assembly or "outdoor unit" 7. Antenna assembly 7 includes a dish-like antenna 9 and a frequency converter 11. Antenna 9 directs the television signals transmitted from satellite 5 to frequency converter 11 which converts the frequencies of all the received television signals to respective lower frequencies. Frequency converter 11 is often called a "block converter" since it converts the frequency band of all of the received television signals as a block.

The television signals produced by block converter 11 are coupled via a coaxial cable 13 to a satellite receiver 15. Satellite receiver 15 is sometimes referred to as an "indoor unit" because it is located indoors. Satellite receiver 15 tunes, demodulates and otherwise processes the received television signal as will be described in detail below to produce video and audio signals with a format (NTSC, PAL or SECAM) suitable for processing by a conventional television receiver 17 to which they are coupled. Television receiver 17 produces an image on a display screen 19 in response to the video signals and an audible response by means of speakers 21a and 21b in response to the audio signals.

The satellite television system shown in FIG. 1 is a digital television satellite system in which television information is transmitted in compressed form in accordance with a predetermined digital compression standard such as MPEG. MPEG is an international standard for the coded representation of moving pictures and associated audio information developed by the Motion Pictures Expert Group.

More specifically, within transmitter 1, analog video signals and analog audio signals are converted to respective digital signals. The digital video and audio signals are compressed and encoded according to the MPEG compression and encoding standard. The resultant encoded digital signal has the form of a series or stream of packets corresponding to respective video and audio components. The type of packet is identified by a header code. Packets corresponding to control and other data may also be added the data stream.

In the MPEG standard, the video information is transmitted in the form of a luminance (Y) component and two color difference (U and V) components. For example, the first color difference component may represent the difference between the red image information and the luminance image information (R-Y) and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

Forward error correction (FEC) data is added to the packets in order make the correction of errors due to noise within the transmission path possible. The well known Viterbi and Reed-Solomon types of forward error correction coding may both be advantageously employed. The digital information resulting from the compression, encoding and error correction operations is modulated on a carrier in what is known in the digital transmission field as QPSK (Quaternary Phase Shift Keying) modulation.

Satellite receiver 15 includes a tuner 1501 with a local oscillator and mixer (not shown) for selecting the appropriate carrier signal form the plurality of signals received from antenna assembly 7 and for converting the frequency of the selected carrier to a lower frequency to produce an intermediate frequency (IF) signal. The IF signal is demodulated by a QPSK demodulator 1503 to produce a demodulated digital signal. A FEC decoder 1505 decodes the error correction data contained in the demodulated digital signal, and based on the error correction data corrects the demodulated packets representing video, audio and other information. For example, FEC decoder 1505 may operate according to Viterbi and Reed-Solomon error correction algorithms when Viterbi and Reed-Solomon error correction encoding is employed in transmitter 1. Tuner 1501, QPSK demodulator 1503 and FEC decoder 1505 may be included in a unit available from Hughes Network Systems of Germantown, Md. or from Comstream Corp., San Diego, Calif.

A transport unit 1507 is a demultiplexer which routes the video packets of the error corrected signal to a video decoder 1509 and the audio packets to an audio decoder 1511 via a data bus according to the header information contained in the packets.

Video decoder 1509 cooperates with a random access memory (RAM) 1513 for example, in the form of a dynamic RAM (DRAM), to decode and decompress the video packets to form a stream or sequence of digital words representing respective luminance (Y) and color difference (U and V) components. The sequence of video component representative digital words is coupled to a television encoder 1515 which converts the component representative digital words to a sequence of digital words representing luminance (Y) information and a sequence of digital words representing chrominance (C) information in accordance with the line and field raster scanning format of a conventional television standard such a NTSC, PAL or SECAM. Television signal encoder 1515 generates line (H) and field (V) rate signals and a picture element (pixel) clock signal (P) which are coupled to video decoder 1509 to synchronize the component representative sequence of digital words. The luminance and chrominance representative digital words are converted to analog luminance and chrominance signals by respective sections of a digital-to-analog converter (DAC) 1517.

Audio decoder 1511 decodes and decompresses the audio packets and the resultant digital audio signal is converted to a baseband analog audio signal by a DAC 1519. Although only a single audio channel is indicated in FIG. 1, it will be appreciated that in practice one or more additional audio channels, for example, for stereophonic reproduction, may be provided as is indicated by speakers 21a and 21b.

The baseband analog video and audio signals are coupled to television receiver 17 via respective baseband connections. The baseband analog video and audio signals are also coupled to a modulator 1521 which modulates the analog signals on to a radio frequency (RF) carrier in accordance with a conventional television standard such as NTSC, PAL or SECAM for coupling to the antenna input of a television receiver without baseband inputs.

A microprocessor 1523 provides frequency selection control data to tuner 1501 for controlling the operation of tuner 1501 to tune channels selected by the user. Microprocessor 1523 also operates interactively with transport 1507 to affect the routing of data packets. Microprocessor 1523 additionally provides control data to video decoder 1509 and audio decoder 1511 via a control bus.

Still further, microprocessor 1523 generates control data for causing graphics images, such as alphanumeric characters and/or pictorial graphics, for example, representing status information and operating instructions, to be displayed on screen 19 of television receiver 17. The graphics data specifies the color and position of each picture element (pixel) of the graphics which are to be displayed. The graphics data represents a pixel by pixel map or "bit map" of the graphic image.

Figure 2:
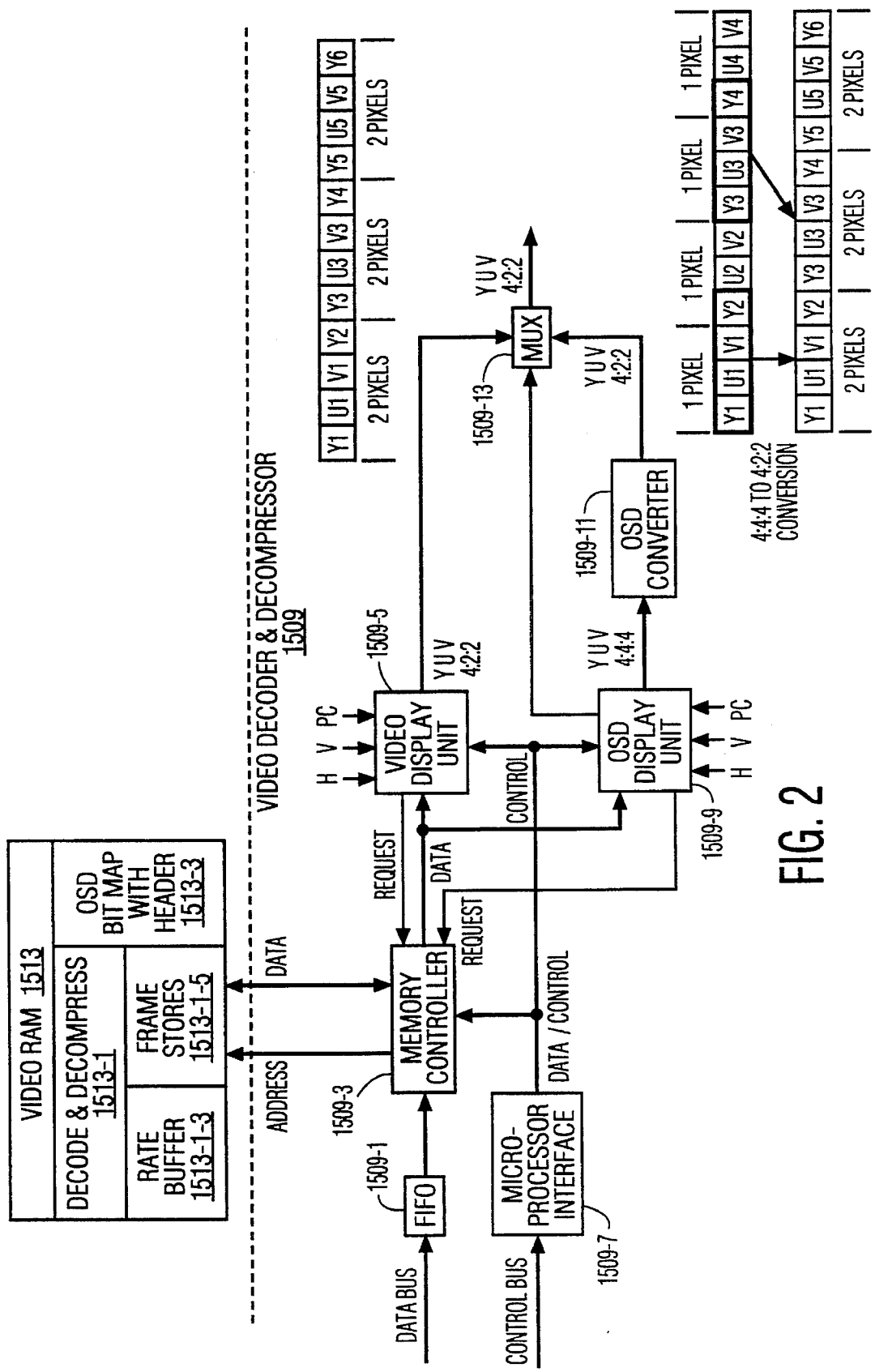
FIG. 2 is a block diagram which disclosed details of the digital video signal processing section of the digital satellite television system shown in FIG. 1 the digital OSD arrangement.

Advantageously, the remaining portion of the on screen display (OSD) arrangement is integrally incorporated in video decoder 1509 and associated video RAM 1513, which are primarily used for the decoding and decompression of the video data packets. The graphics data is coupled to video decoder 1509 via the control bus. As a result of the shared use of video decoder 1509 and associated video RAM 1513, a separate OSD arrangement is not needed. Details of the OSD arrangement will be described with respect to FIG. 2.

Video decoder 1509 is incorporated in a single integrated circuit (IC). Similar video decoding and decompression ICs, with the exception of the OSD provisions to be described below, are commercially available. For example, a MPEG decoding and decompression IC, identified by part number ST3240, is available from SGS Thomson, of France. While the details of the portions of video decoder 1509 concerned with the decoding and decompression of the video data packets is not necessary to understanding the OSD provisions, the following brief description of those portions is helpful.

Video decoder 1509 includes a FIFO (first in, first out) buffer memory 1509-1 which receives video data packets on demand in relatively small segments from transport 1507 and which couples them in relatively larger segments via a memory controller 1509-3 to a section 1513-1 of RAM 1513 reserved for decoding and decompression. Video RAM 1513 is addressed under the control of memory controller 1509-3. Decoding and decompression section 1513-1 of RAM 1513 includes a rate buffer section 1513-1-3 for storing the received video data packets and a frame store section 1513-1-5 for storing frames of video information during the decoding and decompression operation. A video image display unit 1509-5 decodes and decompresses the stored video data packets to form the sequence of video image component representative digital words (Y, U, V). For this purpose, video display unit 1509-5 requests data from decoding and decompression section 1513-1 of video RAM 1513 via memory controller 1509-3 as required. The generation of the component representative digital words is synchronized with the field (V), line (H) and pixel (PC) rate signals generated by television signal encoder 1515. Control data generated by microprocessor 1523 is received by a microprocessor interface unit 1509-7 and coupled to various portions of video decoder 1509 via an internal control bus.

The number of bits contained in the video image component representative digital words determine the number of possible levels and thereby the resolution of the respective components. For n-bit words there are $2^n$ possible levels corresponding to the $2^n$ possible binary states. By way of example, in the present embodiment, the video image component representative word contain eight bits and therefore each component can have $2^8$ or 256 possible levels. The sequence of video image component representative digital words is organized in groups of components in which each group corresponds to plurality of pixels in subsampled or compressed form. More specifically, in the present embodiment, the video image representative groups correspond to two pixels, each of which includes a first luminance representative digital word ($Y_1$) corresponding to a first pixel, a second luminance representative digital word ($Y_2$) corresponding to a second pixel, and a single pair of color difference representative digital words ($U_{1,2}$ and $V_{1,2}$) corresponding to each of the first and second pixels. This has been referred to as a "4:2:2" format in the digital video signal processing field. The subsampling or compression of the color difference signals relates to the image data compression which occurs in the transmitter 1 for the purpose of reducing the transmission bandwidth. More specifically, the transmitted image data is organized in what is known as 4:2:0 format in which the image representative words correspond to four pixels in which there are four luminance representative words corresponding to respective ones of four pixels and a single pair of color difference representative words corresponding to each of the four pixels. The 4:2:0 image representative groups are converted to 4:2:2 image representative groups by interpolation within video display unit 1509-5. A complete set (4:4:4) of components for each pixel is produced by interpolation within television signal encoder 1515.

The OSD portion of video decoder 1509 includes an OSD controller 1509-9 which cooperates with an OSD section 1513-3 of video RAM 1513. The graphics representative bit map generated by microprocessor 1523 is coupled via microprocessor interface unit 1509-7 and memory controller 1509-3 to OSD section 1513-3 of RAM 1513 for storage.

For each pixel of the graphic image there is a digital word representing a color for that pixel. The number of bits contained in the color representative digital words determines how many different colors each pixel can have. If the color representative words contain n bits, then each pixel can have any one of $2^n$ colors corresponding to the $2^n$ possible binary states of the n-bit color word. By way of example, in the present embodiment, the color representative words contain two bits. Accordingly, each graphics pixel can have any one of four colors corresponding to the four possible binary states (00, 01, 10, and 11) of the two-bit color word. The pixel color information is organized in a component form in which for each color word there is a unique group of component representative digital words. The components are selected to be the same as the components used for the transmission of video image information: namely, luminance (Y) and a pair of color differences signal (U and V). The selection of the same components for video images and graphics images simplifies the OSD arrangement because it avoids the need for conversion from one set of components to another. For example, in the present embodiment which utilizes two-bit color words, the following relationship between the color representative digital words and the groups of component representative digital words exits:

| color | group of components |
|---|---|
| 00 | $Y_A, U_A, V_A$ |
| 01 | $Y_B, U_B, V_B$ |
| 10 | $Y_C, U_C, V_C$ |
| 11 | $Y_D, U_D, V_D$ |

The actual color (represented by the subscripts A, B, C or D in the table) of a graphics pixel depends on the value represented by component representative digital words of the respective group. By way of example, in the present embodiment, the graphic image component representative words each contain four bits. Four-bit component representative words provide 16 possible levels for each component. The four bits represent the most significant bits of an eight-bit word which is eventually formed by OSD display unit 1509-9, as will be described below.

The graphic image component representative words are transmitted to and stored in OSD section 1513-3 of RAM 1513 from microprocessor 1523 in component groups as is indicated in the table in the form of a header for the bit map. In the present embodiment, in which each graphic image component representative digital word contains four bits, each group includes 12 bits. The colors of a graphics image may be changed by changing the four bits of one of more component representing words of the header, depending on the nature of the graphics image to be displayed.

OSD display unit 1509-9 causes the bit map to be read out from OSD section 1513-3 of RAM 1513, and converts the color representative word for each pixel to the corresponding component representative group from the header. For this purpose, OSD display unit 1509-9 requests data from OSD section 1513-3 via memory controller 1509-3 as required. Since, in the present embodiment the graphic image component representative words contain only four bits while the video image representative words contain eight bits, OSD display unit 1509-9 converts the four-bit graphic image component representative words to eight-bit words by simply adding four binary "0s" as the least four significant bits to the four-bit words. The generation of the graphic image component representative digital words by OSD display unit 1509-9 is also synchronized with the field (V), line (H) and pixel (PC) rate signals generated by television signal encoder 1515.

As earlier noted, the video image component representative groups generated by video image display unit 1509-5 represent video image information in a compressed form in which for every two pixels there are two respective luminance representative words and one pair of color difference representative words in a so-called 4:2:2 format. On the other hand, the graphic image component representative groups stored in OSD section 1513-3 of RAM 1513 and generated by OSD display unit 1509-9 represent graphics image information in an uncompressed form in which for every one pixel there is one luminance representative word and one pair of color difference representative words (or for every two pixels there are two respective luminance representative words and two respective pairs of color difference representative words). The latter uncompressed format has become known as the "4:4:4" format in the digital video signal processing field. The 4:4:4 graphics image sequence is desirable since it allows as many colors as possible to be defined with a given number of bits because it provides for a unique luminance component and two unique color difference components for each pixel of graphics. However, the 4:4:4 graphic image sequence is not compatible with the 4:2:2 video image sequence and cannot be readily multiplexed with it to so as to insert a graphic image into a video image.

Figure 3:
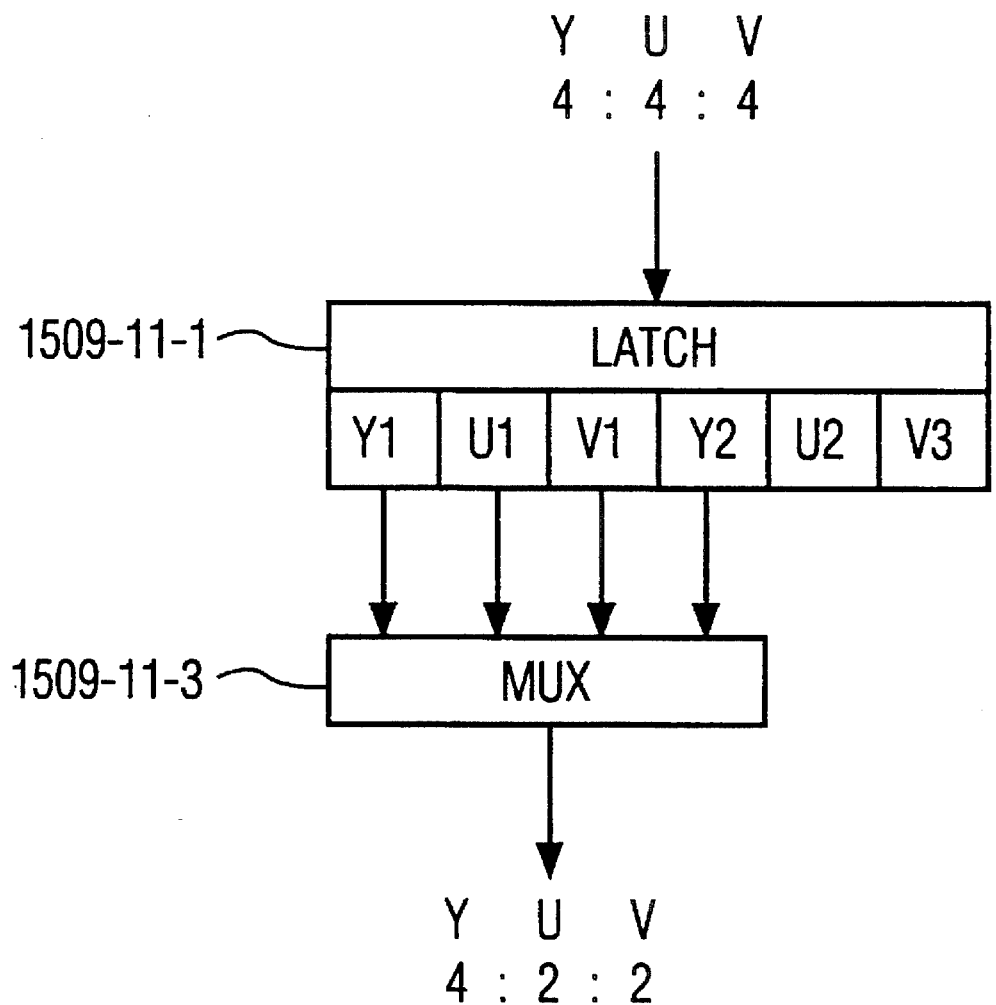
FIG. 3 is a block diagram of a converter used in the OSD arrangement shown in FIG. 2.

To solve this problem, video decoder 1509 includes an OSD converter 1509-11 for converting the 4:4:4 sequence used for the graphic image components to the 4:2:2 sequence used for the video image components. As is pictorially indicated in FIG. 2, for every two graphics pixels, converter 1509-11 selects the pair of color difference components for the first pixel and deletes the pair for the second pixel. As shown in as shown in FIG. 3, OSD converter 1509-11 may comprise a latch 1509-11-1 for storing two groups of graphic image component representative words, and a multiplexer 1509-11-3 which selects the appropriate component representative words in sequence from those stored in latch 1509-11-1 at the output rate. It is desirable that the number of 4:4:4 groups of graphic image representative components per line be an even number because two of the original 4:4:4 graphic image groups are used to produce each new one of the 4:2:2 graphic image groups.

While the output sequence is shown as being, in the order named, a first luminance (Y) component for a first pixel of two pixels, a first color difference component (U) for each of the two pixels and a second color difference component (V) for each of the two pixels, and a second luminance component for the second of the two pixels, other output sequences may be used. For example, the output sequence may be, in the order named, a first color difference component (U) for each of the two pixels, a first luminance (Y) component for a first pixel of two pixels, a second color difference component (V) for each of the two pixels, and a second luminance component for the second of the two pixels.

An output multiplexer 1509-13 selects either groups of video image component representative words provided by video display unit 1509-5 or groups of graphic image component representative words provided by OSD converter 1509-11 under the control of OSD display unit 1509-9. In a video image only mode of operation, output multiplexer 1509-13 selects only the video image groups. In a graphic image only mode of operation, output multiplexer 1509-13 selects only the graphic image groups. In a "superimpose" mode of operation, in which the graphic image is inserted within a video image, output multiplexer 1509-13 selects either the video image groups or the graphic image groups on a pixel by pixel basis. The 4:2:2 output sequence of component representative words produced by output multiplexer 1509-13 is coupled to television signal encoder 1515.

I claim:

1. Apparatus comprising:

a source of digital packets representing analog video signals in compressed form;

a decoder for producing a sequence of digital words representing respective components of a video image corresponding to said analog video signal and organized in repetitive video image groups in response to said digital packets; each of said video image groups corresponding to two picture elements and including a first luminance component corresponding to a first picture element of said two picture elements, a second luminance component corresponding to a second picture element of said two picture elements, and two color difference components corresponding to each of said two picture elements;

a memory for storing a sequence of digital words representing respective components of a graphics image and organized in repetitive graphics image groups; each of said graphics image groups corresponding to one picture element and including a luminance component and two color difference components corresponding to said picture element;

a converter coupled to said memory for converting respective pairs of sequential graphics image groups stored in said memory to new graphic image groups; each of said new graphics image groups corresponding to two picture elements and including a first luminance component corresponding to a first picture element of said two picture elements, a second luminance component corresponding to a second picture element of said two picture elements, and two color difference components corresponding to each of said picture elements; and a multiplexer responsive to said video image groups and to said new graphics image groups for selecting either said video image groups or said graphics image groups to produce a sequence of resultant image groups; each of said resultant image groups corresponding to two picture elements and including a first luminance component corresponding to a first picture element of said two picture elements, a second luminance component corresponding to a second picture element of said two picture elements, and two color difference components corresponding to each of said two picture elements.

2. The apparatus recited in claim 1, further including:

a second converter responsive to said sequence of resultant image groups for producing a sequence of output image groups in which respective ones of said resultant image groups have been converted to respective pairs output image groups; each of said pairs of output image groups corresponding to one picture element; a first one of said output image groups including said first luminance component and said two color difference components of a respective one of said resultant image groups; a second one of said output image groups including said second luminance component and said two color difference components of said respective one of said resultant image groups.

3. The apparatus recited in claim 2, further including:

a digital to analog converter for converting said sequence of output signal groups to respective analog video signal components.

4. The apparatus recited in claim 1, wherein:

a first of said two color difference components represents the difference between the respective luminance component and first primary color; and a second of said two color difference components represents the difference between the respective luminance component and second primary color.

5. The apparatus recited in claim 1, wherein:

said memory includes a section operatively coupled with said decoder.

6. Apparatus comprising:

a source of a sequence of digital words representing respective components of a video image and organized in repetitive video image groups; each of said video image groups corresponding to two picture elements and including a first luminance component corresponding to a first picture element of said two picture elements, a second luminance component corresponding to a second picture element of said two picture elements, and two color difference components corresponding to each of said two picture elements;

a memory for storing a sequence of digital words representing respective components of a graphics image and organized in repetitive graphics image groups; each of said graphics image groups corresponding to one picture element and including a luminance component and two color difference components corresponding to said picture element;

a converter coupled to said memory for converting respective pairs of sequential graphics image groups stored in said memory to new graphic image groups; each of said new graphics image groups corresponding to two picture elements and including a first luminance component corresponding to a first picture element of said two picture elements, a second luminance component corresponding to a second picture element of said two picture elements, and two color difference components corresponding to each of said two picture elements; and a multiplexer responsive to said video image groups and to said new graphics image groups for selecting either said video image groups or said graphics image groups to produce a sequence of resultant image groups; each of said resultant image groups corresponding to two picture elements and including a first luminance component corresponding to a first picture element of said two picture elements, a second luminance component corresponding to a second picture element of said two picture elements, and two color difference components corresponding to each of said two picture elements.

7. The apparatus recited in claim 6, further including:

a second converter responsive to said sequence of resultant image groups for producing a sequence of output image groups in which respective ones of said resultant image groups have been converted to respective pairs of output image groups; each of said pairs of output image groups corresponding to one picture element; a first one of said output image groups including said first luminance component and said two color difference components of a respective one of said resultant image groups; a second one of said output image groups including said second luminance component and said two color difference components of said respective one of said resultant image groups.

8. The apparatus recited in claim 7, further including:

a digital to analog converter for converting said sequence of output signal groups to respective analog video signal components.

9. The apparatus recited in claim 6, wherein:

a first of said two color difference components represents the difference between the respective luminance component and first primary color; and a second of said two color difference components represents the difference between the respective luminance component and second primary color.

10. Apparatus comprising:

a source of a sequence of digital words representing respective components of a video image and organized in repetitive video image groups; each of said video image groups corresponding to a number N, more than one, of picture elements and including a number N of luminance components corresponding to respective ones of said N picture elements and two color difference components corresponding to each of said N picture elements;

a memory for storing a sequence of digital words representing respective components of a graphics image and organized in repetitive graphics image groups; each of said graphics image groups corresponding to one picture element and including a luminance component and two color difference components corresponding to said picture element;

a converter coupled to said memory for converting respective ones of said graphics image groups stored in said memory to new graphic image groups; each of said new graphics image groups corresponding to N picture elements and including N luminance components corresponding to respective ones of said N picture elements and two color difference components corresponding to each of said N picture elements; and a multiplexer responsive to said video image groups and to said new graphics image groups for selecting either said video image groups or said graphics image groups to produce a sequence of resultant image groups; each of said resultant image groups corresponding to N picture elements and including N luminance components corresponding to respective ones of said N picture elements and two color difference components corresponding to each of said N picture elements.

* * * * *

UNITED STATES PATENT AND TRADEMARK OFFICE
CERTIFICATE OF CORRECTION

PATENT NO. : 5,489,947
DATED : February 6, 1996
INVENTOR(S) : Jeffrey Allen Cooper and Harold Blatter It is certified that error appears in the above-indentified patent and that said Letters Patent is hereby corrected as shown below:

On the Title page, item [75] Inventors: should read--

Jeffrey A. Cooper, Indianapolis, Indiana;
Harold Blatter, Indianapolis, Indiana --.

Signed and Sealed this

Fourteenth Day of May, 1996

Attest:

BRUCE LEHMAN

*Attesting Officer*  *Commissioner of Patents and Trademarks*